(12) United States Patent
Lee

(10) Patent No.: US 11,448,741 B2
(45) Date of Patent: Sep. 20, 2022

(54) ROBOT AND METHOD FOR LOCALIZING ROBOT

(71) Applicant: LG ELECTRONICS INC., Seoul (KR)

(72) Inventor: Hak Joo Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 356 days.

(21) Appl. No.: 16/706,451

(22) Filed: Dec. 6, 2019

(65) Prior Publication Data
US 2021/0041547 A1 Feb. 11, 2021

(30) Foreign Application Priority Data
Aug. 7, 2019 (KR) .................. 10-2019-0096352

(51) Int. Cl.
| | |
|---|---|
| G01S 11/06 | (2006.01) |
| G01S 1/70 | (2006.01) |
| G05D 1/02 | (2020.01) |
| G05D 1/00 | (2006.01) |

(52) U.S. Cl.
CPC .............. *G01S 11/06* (2013.01); *G01S 1/70* (2013.01); *G05D 1/0221* (2013.01); *G05D 1/0088* (2013.01)

(58) Field of Classification Search
CPC ........ G01S 11/06; G01S 1/70; G01S 5/02522; G01S 5/02527; G05D 1/0221; G05D 1/0088; G05D 1/0285; G05D 2201/0211; G01C 21/206; B25J 9/1664; B25J 9/161; B25J 9/163; B25J 9/1692
See application file for complete search history.

(56) References Cited

U.S. PATENT DOCUMENTS

2018/0321687 A1* 11/2018 Chambers ............... G06F 16/29

FOREIGN PATENT DOCUMENTS

| CN | 105466421 A | * | 4/2016 |
|---|---|---|---|
| KR | 1020170034069 | | 3/2017 |

* cited by examiner

*Primary Examiner* — Marthe Y Marc-Coleman
(74) *Attorney, Agent, or Firm* — Lee, Hong, Degerman, Kang & Waimey PC

(57) ABSTRACT

A robot and a method for localizing a robot are disclosed. The method for localizing a robot may include acquiring communication environment information including identifiers of access points and received signal strengths from the access points, generating an environmental profile for a current position of the robot based on the acquired communication environment information, comparing the generated environmental profile with a plurality of learning profiles associated with a plurality of regions, respectively, determining a learning profile corresponding to the environmental profile, based on the comparison, and determining a region associated with the determined learning profile as a current position of the robot. In a 5G environment connected for the Internet of Things, embodiments of the present disclosure may be implemented by executing an artificial intelligence algorithm and/or machine learning algorithm.

17 Claims, 10 Drawing Sheets

FIG. 5A

| MAC address | RSSI | | | |
|---|---|---|---|---|
| 60:a4:4c:a0:5d:bc | 5 | 4 | 5 | 5 |
| 34:97:f6:6c:c3:a0 | 19 | 19 | 19 | 19 |
| 00:23:04:88:ef:a6 | 16 | 16 | 16 | 16 |
| 00:23:04:88:ef:a7 | 16 | 16 | 16 | 16 |
| 00:23:04:88:ef:a8 | 16 | 16 | 16 | 16 |
| 00:23:04:88:ef:a9 | 17 | 17 | 17 | 18 |
| 00:23:04:88:dd:9a | 11 | 11 | 11 | 11 |
| 34:97:f6:6c:c3:a4 | 18 | 17 | 17 | 18 |
| 9c:3d:cf:42:25:60 | 8 | 8 | 9 | 8 |
| 34:97:f6:6c:c3:a8 | 17 | 17 | 17 | 17 |

FIG. 5B

| MAC address | PROBABILITY MAP OF RSSI | |
|---|---|---|
| 60:a4:4c:a0:5d:bc | 5 | 0.75 |
| | 4 | 0.25 |
| 34:97:f6:6c:c3:a0 | 19 | 1.0 |
| 00:23:04:88:ef:a6 | 16 | 1.0 |
| 00:23:04:88:ef:a7 | 16 | 1.0 |
| 00:23:04:88:ef:a8 | 16 | 1.0 |
| 00:23:04:88:ef:a9 | 17 | 0.75 |
| | 18 | 0.25 |
| 00:23:04:88:dd:9a | 11 | 1.0 |
| 34:97:f6:6c:c3:a4 | 18 | 0.5 |
| | 17 | 0.5 |
| 9c:3d:cf:42:25:60 | 8 | 0.75 |
| | 9 | 0.25 |
| 34:97:f6:6c:c3:a8 | 17 | 1.0 |

FIG. 6

| MAC address | RSSI | PROBABILITY VALUE |
|---|---|---|
| 60:a4:4c:a0:5d:bc | 4 | 0.25 |
| 34:97:f6:6c:c3:a0 | 19 | 1.0 |
| 00:23:04:88:ef:a6 | 16 | 1.0 |
| 00:23:04:88:ef:a7 | 15 | 0 |
| 00:23:04:88:ef:a8 | 16 | 1.0 |
| 00:23:04:88:ef:a9 | 17 | 0.75 |
| 00:23:04:88:dd:9a | 11 | 1.0 |
| 34:97:f6:6c:c3:a4 | 18 | 0.5 |
| 9c:3d:cf:42:25:60 | 9 | 0.25 |
| 34:97:f6:6c:c3:a8 | 17 | 1.0 |
| | | Score: 6.75 |

ROBOT AND METHOD FOR LOCALIZING ROBOT

CROSS-REFERENCE TO RELATED APPLICATION

Pursuant to 35 U.S.C. § 119(a), this application claims the benefit of an earlier filing date of and the right of priority to Korean Application No. 10-2019-0096352, filed in Korea on Aug. 7, 2019, the contents of which are incorporated by reference herein in their entirety.

BACKGROUND

1. Technical Field

The present disclosure relates to a robot, and more particularly, to localization of a robot.

2. Description of Related Art

Recently, robots that can be conveniently used in daily life have been actively developed. Such robots are being used to help people in their daily lives in homes, schools and public places.

Mobile robots such as guide robots, delivery robots, and cleaning robots perform tasks while driving autonomously without the manipulation of a user. For a robot to drive autonomously, localization of the robot is necessary. According to the related art, a current position of the robot can be recognized using a map of an environment in which the robot operates, and various sensor data.

However, when an unexpected movement of the robot occurs (for example, when the user moves the robot to an arbitrary location, or when a robot that ran out of battery starts up again at an arbitrary location), the robot may be unable to properly recognize its current location.

Korean Patent Application Publication No. 10-2017-0034069 discloses a method of recognizing a relative position of a mobile robot with respect to a local map. Here, when the user moves a mobile robot to an arbitrary location, the mobile robot scans its surrounding to obtain a local map. Moreover, data of a real sensor is acquired while the mobile robot rotates. In the method described above, matching between the local map and the data is performed to recognize a relative position of the mobile robot with respect to the local map.

However, in order to use such an algorithm, expensive sensors, such as a lidar sensor, which can accurately measure the distance with respect to a nearby object, are required. In addition, the disclosed algorithm has limited application to mobile robots operated in a wide open space or a space in which surrounding structures are hard to distinguish.

In the event of an unexpected movement of a robot that is not equipped with such expensive sensors, quick and effective localization of the robot is necessary. Moreover, there is a need for a technology capable of localizing a robot without relying on the surrounding structures.

SUMMARY OF THE INVENTION

An aspect of the present disclosure is to provide a method and apparatus for quickly and effectively recognizing the current position of a robot in the event of an unexpected movement of the robot.

Another aspect of the present disclosure is to provide a method and apparatus for effectively recognizing the current position of a robot at a low cost.

Still another aspect of the present disclosure is to provide a method and apparatus for recognizing the current position of a robot without relying on surrounding structures.

Still another aspect of the present disclosure is to provide a method and apparatus for enabling a robot to effectively correct its current position while normally driving.

Embodiments of the present disclosure are not limited to the above-mentioned aspects, and other aspects and advantages of the present disclosure, which are not mentioned above, may be understood by the following description, and will be more clearly understood by embodiments of the present disclosure. Moreover, aspects and advantages of the present disclosure may be realized by the means and combinations thereof indicated in claims.

A robot and a method for localizing a robot according to an embodiment of the present disclosure may determine a current position of a robot based on communication environment information including identifiers of access points and received signal strengths from access points.

A method for localizing a robot according to an embodiment of the present disclosure may include acquiring communication environment information including identifiers of access points and received signal strengths from the access points, generating an environmental profile for a current position of the robot, based on the acquired communication environment information, comparing the generated environmental profile with a plurality of learning profiles associated with a plurality of regions, determining a learning profile corresponding to the environmental profile, based on the comparison, and determining a region associated with the determined learning profile as a current position of the robot.

The communication environment information may further include information about at least one of a beacon signal or a visible light communication signal.

The method for localizing a robot according to an embodiment of the present disclosure may further include acquiring surrounding environment information of the current position, and the generating an environmental profile may be further based on the acquired surrounding environment information.

Each of the plurality of learning profiles may include a probability map of a received signal strength for each of access points.

The comparing may include, for each learning profile, determining whether access points in the environmental profile match access points in the learning profile, associating the received signal strengths of the matched access points with the probability map, and determining a degree of similarity between the environmental profile and the learning profile, based on the association.

The determining a learning profile corresponding to the environmental profile may include determining a learning profile having the highest degree of similarity as a learning profile corresponding to the environmental profile.

A central point of a region associated with the determined learning profile may be determined as the current position of the robot.

The method for localizing a robot according to an embodiment of the present disclosure may further include correcting the current position of the robot, by analyzing the acquired communication environment information or the generated environmental profile using a learning model based on an artificial neural network.

A method for localizing a robot may according to another embodiment of the present disclosure may include determining a current position of the robot, mapping the determined current position to a corresponding region of a plurality of regions, acquiring communication environment information including identifiers of access points and received signal strengths from the access points, and generating or updating a learning profile for the corresponding region, based on the acquired communication environment information.

The communication environment information may further include information about at least one of a beacon signal or a visible light communication signal.

The learning profile may include a probability map of a received signal strength for each of access points.

The generating or updating a learning profile may include generating or modifying the probability map.

The method for localizing a robot according to another embodiment of the present disclosure may further include training an artificial neural network by using, as learning data, the acquired communication environment information, the determined current position, and the learning profile.

A robot according to another embodiment of the present disclosure may include a communicator configured to acquire communication environment information including identifiers of access points and received signal strengths from the access points, and at least one processor, and the at least one processor may be configured to generate an environmental profile for a current position of the robot, based on the acquired communication environment information, compare the generated environmental profile with a plurality of learning profiles associated with a plurality of regions, determine a learning profile corresponding to the environmental profile, based on the comparison, and determine a region associated with the determined learning profile as a current position of the robot.

The communication environment information may further include information about at least one of a beacon signal or a visible light communication signal.

The robot according to this embodiment of the present disclosure may further include one or more sensors configured to acquire surrounding environment information of the current position, and the at least one processor may be configured to generate the environmental profile further based on the acquired surrounding environment information.

Each of the plurality of learning profiles may include a probability map of a received signal strength for each of access points.

The at least one processor may be configured to, for each learning profile: determine whether access points in the environmental profile match access points in the learning profile, associate the received signal strengths of the matched access points with the probability map, and determine a degree of similarity between the environmental profile and the learning profile based on the association.

The at least one processor may be configured to determine a learning profile having the highest degree of similarity as a learning profile corresponding to the environmental profile.

The at least one processor may be configured to determine, as the current position, a central point of a region associated with the determined learning profile.

According to an embodiment of the present disclosure, a program code may be stored in a computer readable storage medium, and when executed, the program code may allow at least one processor to perform the method for localizing a robot described above.

According to embodiments of the present disclosure, even in the event of an unexpected movement of a robot, the robot may recognize its position quickly and effectively.

In addition, a robot not having a relatively expensive sensor may effectively recognize its current position.

Further, a robot may recognize its current position without depending on surrounding structures.

Furthermore, a robot in a normal driving state may effectively correct its current position.

In addition, only summary data may be maintained in an environmental profile and a learning profile, thereby improving the processing speed and efficiency. Accordingly, a robot may recognize its current position without support of a server.

Further, particularly in a highly Wi-Fi dense region, a robot may effectively recognize its current position.

Effects of the present disclosure are not limited to the above-mentioned effects, and other effects, not mentioned above, will be clearly understood by those skilled in the art from the description of claims.

BRIEF DESCRIPTION OF THE DRAWINGS

The above and other aspects, features, and advantages of the present disclosure will become apparent from the detailed description of the following aspects in conjunction with the accompanying drawings, in which:

FIGS. 5A and 5B are views illustrating a probability map of a learning profile according to an embodiment of the present disclosure;

FIG. 6 is a view illustrating localization based on an environmental profile according to an embodiment of the present disclosure;

DETAILED DESCRIPTION

Figure 1:
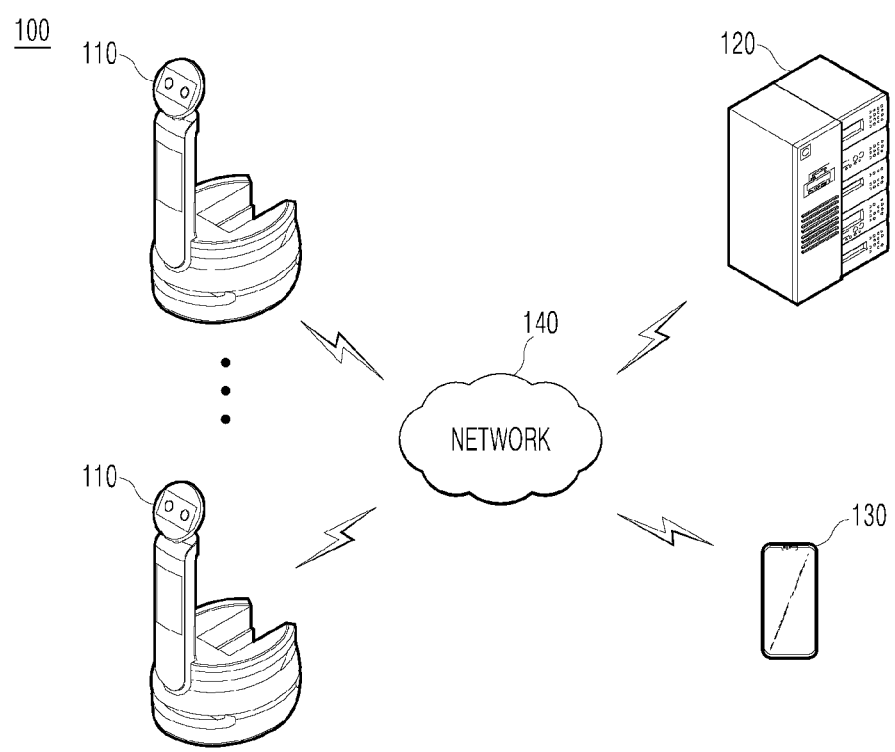
FIG. 1 is a view of a robot system according to an embodiment of the present disclosure.

Hereinafter, the embodiments disclosed in the present specification will be described in detail with reference to the accompanying drawings, the same or similar elements regardless of a reference numeral is denoted by the same reference numeral and a duplicate description thereof will be omitted. In the following description, the terms "module" and "unit" for referring to elements are assigned and used exchangeably in consideration of convenience of explanation, and thus, the terms per se do not necessarily have different meanings or functions. Wherever possible, the same reference numbers will be used throughout the drawings to refer to the same or like parts.

In the following description, known functions or structures, which may confuse the substance of the present disclosure, are not explained. The accompanying drawings are used to help easily explain various technical features and it should be understood that the embodiments presented herein are not limited by the accompanying drawings. As such, the present disclosure should be construed to extend to any alterations, equivalents and substitutes in addition to those which are particularly set out in the accompanying drawings.

Although the terms first, second, third, and the like, may be used herein to describe various elements, components, regions, layers, and/or sections, these elements, components, regions, layers, and/or sections should not be limited by these terms. These terms are generally only used to distinguish one element from another.

It should be understood that when an element is referred to as being "connected to," or "coupled to" another element, it can be directly connected or coupled to the other element, but intervening elements can also be present. The terms "connected" and "coupled" are not restricted to physical or mechanical connections or couplings, and can include electrical connections or couplings, whether direct or indirect.

The connection can be such that the objects are permanently connected or releasably connected.

A robot may refer to a machine which automatically handles a given task by its own ability, or which operates autonomously. In particular, a robot having a function of recognizing an environment and performing an operation according to its own judgment may be referred to as an intelligent robot.

Robots may be classified into industrial, medical, household, and military robots, according to the purpose or field of use.

A robot may include an actuator or a driving unit including a motor in order to perform various physical operations, such as moving joints of the robot. Moreover, a movable robot may include, for example, a wheel, a brake, and a propeller in the driving unit thereof, and through the driving unit may thus be capable of traveling on the ground or flying in the air.

Autonomous driving refers to a technology in which driving is performed autonomously, and an autonomous vehicle refers to a vehicle capable of driving without manipulation of a user or with minimal manipulation of a user.

For example, autonomous driving may include a technology in which a driving lane is maintained, a technology such as adaptive cruise control in which a speed is automatically adjusted, a technology in which a vehicle automatically drives along a defined route, and a technology in which a route is automatically set when a destination is set.

A vehicle includes a vehicle having only an internal combustion engine, a hybrid vehicle having both an internal combustion engine and an electric motor, and an electric vehicle having only an electric motor, and may include not only an automobile but also a train and a motorcycle.

In this case, an autonomous vehicle may be considered as a robot with an autonomous driving function.

FIG. 1 is a view of a robot system according to an embodiment of the present disclosure. Referring to FIG. 1, a robot system 100 according to an embodiment of the present disclosure includes one or more robots 110 and a control server 120, and may optionally further include a terminal 130.

The one or more robots 110, the control server 120, and the terminal 130 may be connected to each other through a network 140. The one or more robots 110, the control server 120, and the terminal 130 may communicate with each other through a base station or an access point, but may also directly communicate with each other without going through a base station.

The one or more robots 110 may perform a task in a space and provide information or data related to the task for the control server 120. A workspace of a robot may be indoors or outdoors. A robot may be operated in a predefined space by a wall or a column. A workspace of a robot may be defined in various ways depending on the design purpose, a working attribute of a robot, mobility of a robot, and various other factors. A robot may be operated in an open space, which is not predefined. The robot may also sense a surrounding environment and determine a workspace by itself.

The one or more robots 110 may provide its state information or data for the control server 120. For example, the state information may include information about a location of a robot, information about a level of a battery of a robot, and information about a state and a replacement cycle of components or supplies.

The control server 120 may perform various analysis based on information or data provided by the one or more robots 110, and control an overall operation of a robot system based on the analysis result. In an aspect, the control server 120 may directly control driving of the robot 110 based on the analysis result. In another aspect, the control server 120 may derive and output useful information or data from the analysis result. In still another aspect, the control server 120 may adjust parameters in a robot system using the derived information or data. The control server 120 may be implemented as a single server, but may be implemented as a plurality of server sets, a cloud server, or a combination thereof.

The terminal 130 may share the role of the control server 120. In an aspect, the terminal 130 may obtain information or data from the one or more robots 110 and provide the information or data for the control server 120, or may obtain information or data from the control server 120 and provide the information or data for the one or more robots 110. In another aspect, the terminal 130 may share at least a portion of analysis to be performed by the control server 120, and may provide a result of the analysis for the control server 120. In still another aspect, the terminal 130 may receive an analysis result, information, or data from the control server 120, and may simply output the analysis result, information, or data.

In an embodiment, the terminal 130 may replace the control server 120. In another embodiment, at least one robot of a plurality of robots 110 may replace the control server 120. In this case, the plurality of robots 110 may be connected to each other to be communicated with each other.

The terminal 130 may include various electronic devices capable of communicating with the robot 110 and the control server 120. For example, the terminal 130 may be implemented as a stationary terminal and a mobile terminal, such as a mobile phone, a smartphone, a laptop computer, a terminal for digital broadcast, a music player, a video player, a personal digital assistant (PDA), a portable multimedia player (PMP), a navigation system, a slate PC, a tablet PC, an Ultrabook, a wearable device (for example, a smartwatch, a smart glass, and a head mounted display (HMD)), a set-top box (STB), a digital multimedia broadcast (DMB) receiver, a radio, a television (TV), a laundry machine, a refrigerator, a cleaner, an air conditioner, an air purifier, a clothes treating apparatus, a personal care device, a desktop computer, a projector, and a digital signage.

The network 140 may refer to a network which configures a portion of a cloud computing infrastructure or which is provided in a cloud computing infrastructure. The network 140 may be, for example, a wired network such as local area networks (LANs), wide area networks (WANs), metropolitan area networks (MANs), or integrated service digital networks (ISDNs), or a wireless communications network such as wireless LANs, code division multiple access (CDMA), wideband CDMA (WCDMA), long term evolution (LTE), long term evolution-advanced (LTE-A), 5G (generation) communications, Bluetooth™, or satellite communications, but is not limited thereto.

The network 140 may include connection of network elements such as hubs, bridges, routers, switches, and gateways. The network 140 may include one or more connected networks, for example, a multi-network environment, including a public network such as the Internet and a private network such as a secure corporate private network. Access to the network 140 may be provided through one or more wire-based or wireless access networks. Further, the network 140 may support various types of machine-to-machine (M2M) communications (for example, Internet of Things (IoT), Internet of Everything (IoE), Internet of Small Things (IoST)), transmitting and receiving information between distributed components such things to process the information, and/or 5G communications.

When an unexpected movement of the robot 110 occurs (for example, when the user moves the robot 110 to an arbitrary position, or when the robot 110 that ran out of battery starts up again at an arbitrary location), the robot 110 may be unable to properly recognize its current location. The robot 110 may recognize its location by deriving a distance from surrounding structures using a LiDAR sensor or a camera. However, there is a limit to application of such a technique in a space in which it is difficult to distinguish the surrounding structures.

Thus, in embodiments of the present disclosure, methods are provided in which the robot 110 may quickly and effectively recognize its location by using only an operation of scanning wireless signals at a specific location.

Figure 2:
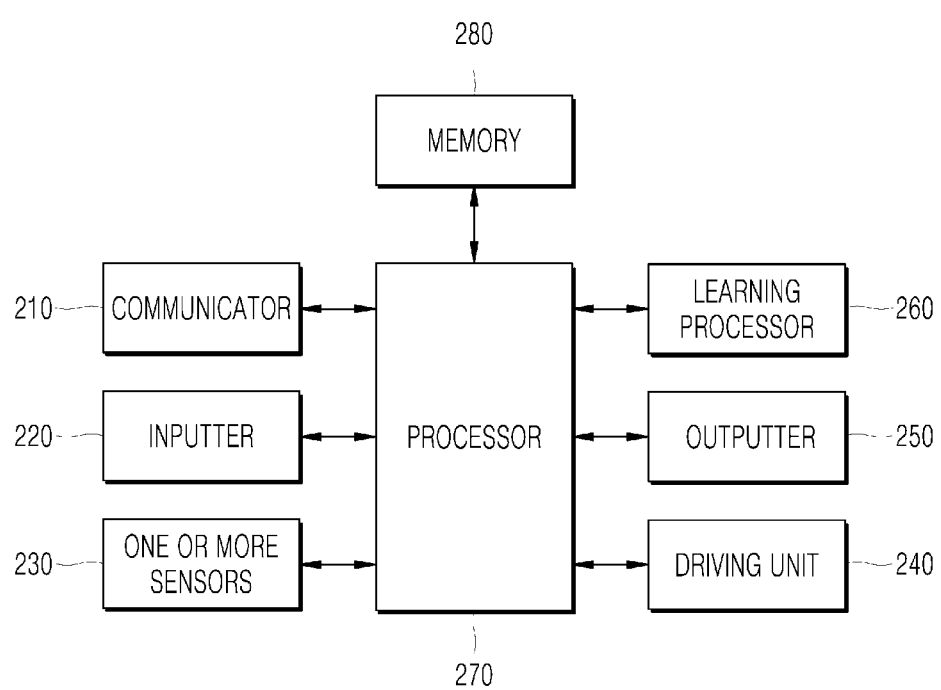
FIG. 2 is a block diagram illustrating a configuration of a robot according to an embodiment of the present disclosure.

FIG. 2 is a block diagram illustrating a configuration of a robot according to an embodiment of the present disclosure.

Referring to FIG. 2, a robot 200 according to an embodiment of the present disclosure may include a communicator 210, an inputter 220, one or more sensors 230, a driving unit 240, an outputter 250, a memory 280, and a processor 270.

The communicator 210 may transmit and receive information or data with external devices such as the control server 120, or the terminal 130 using wired or wireless communication technology. For example, the communicator 210 may transmit or receive sensor data, measurement data, input data, a learning model, and a control signal with the external devices. The communicator 210 may use the communication technology, such as Global System for Mobile communication (GSM), code division multiple access (CDMA), long term evolution (LTE), 5G, wireless LAN (WLAN), wireless fidelity (Wi-Fi), Bluetooth™, radio frequency identification (RFID), Infrared Data Association (IrDA), ZigBee, near field communication (NFC), visible light communication, and light fidelity (Li-Fi).

The communicator 210 may scan wireless signals to acquire communication environment information, and provide the acquired communication environment information to the processor 270. The communication environment information may refer to context information about a communication environment at a specific location. The communication environment information may be defined or represented by at least one piece of information, data, or a measured value, acquired by the communicator 210 at a specific location.

In an embodiment, the communication environment information may include identifiers of access points and received signal strengths from the access points. The identifier of the access point may include various types of identification information to distinguish an access point from other access points, and the access point may be a name of an access point, a service set identifier (SSID), and a media access control (MAC) address, by way of example. The received signal strength from the access point may include various measured values indicating a strength of a wireless signal, received from an access point, such as a received signal strength indicator (RSSI), a signal-to-noise ratio (SNR), or a level of power. The received signal strength may be expressed as a relative level, or may be expressed in a unit of measurement such as dB or dBm.

The access point (AP) is a network device providing network connectivity for wireless devices. The access point may be a portion of a gateway or a router, or may be a stand-alone device. In an embodiment, the access point may include, for example, a wireless access point according to the IEEE 802.11 standard, a Wi-Fi hot spot, and a wired/wireless router. In another embodiment, the access point may include, for example, a base station according to mobile communication standards such as 3G, LTE, LTE-A, and 5G, an Evolved Node B (eNB), a Node B, a basic service set (BSS), and an extended service set (ESS).

In an embodiment, the communicator 210 may scan wireless LAN signals or Wi-Fi signals according to the IEEE 802.11 standard, and acquire SSIDs and RSSIs of access points transmitting the corresponding signals. Acquisition of communication environment information through a Wi-Fi scan may be performed periodically or in response to a request from the processor 270.

In an embodiment, the communication environment information may include information about a beacon signal. A beacon transmitter, disposed in a store or a restaurant, may periodically transmit a beacon signal in order to provide information or a coupon regarding a corresponding store. The beacon signal may be broadcasted using near field communication technology such as Bluetooth™, Bluetooth Low Energy (BLE), near field communication (NFC), iBeacon, and infrared communications. The communicator 210 may acquire information about a beacon signal, transmitted by a nearby beacon transmitter, as communication environment information.

Information about a beacon signal may include identifiers of beacon signals, received signal strengths of beacon signals, and beacon state information. The identifier of a beacon signal may include various types of identification information used to distinguish a beacon signal, such as an Eddystone Unique Identifier (Eddystone-UID), an Eddystone Uniform Resource Locator (Eddystone-URL), a universally unique identifier (UUID), a Major value, and a Minor value, according to beacon standards. The received signal strength of a beacon signal may include various measured values indicating a strength of a beacon signal, such as RSSI, or SNR, or a level of power. The beacon state information may include Eddystone Telemetry (Eddystone-TLM) indicating information on a battery voltage of a beacon transmitter, a temperature, the number of transmitted packets, and the operating time.

In an embodiment, the communication environment information may include information about a visible light communication (VLC) signal. That is, the communicator 210 may acquire the VLC signal, transmitted from surrounding LED light, as communication environment information. VLC is a technology for transmitting and receiving data using flickering of a light emitting diode (LED). Visible light, from surrounding LED light, may be received by the communicator 210. The communicator 210 may include a photodiode (PD) for converting the received light into an electrical signal. The information about the VLC signal may include information on a VLC identifier, a flickering frequency of visible light, and a dimming rate.

The identifiers of access points acquired by the communicator 210, received signal strengths from access points, information about a beacon signal, information about a VLC signal, or any combination thereof may be used as a fingerprint for a specific location.

The inputter 220 may obtain various types of data. The inputter 220 may include at least one camera for obtaining a video signal, a microphone for obtaining an audio signal, and a user interface for receiving information from a user.

The inputter 220 may obtain data such as learning data for constructing a learning model and input data used when an output is obtained using a learning model. The inputter 220 may acquire raw input data. In this case, the processor 270 or the learning processor 260 may extract an input feature by preprocessing the input data.

In an embodiment, the inputter 220 may receive the communication environment information, described above, through a user interface. In other words, the communication environment information, described above, may be input by a user through the inputter 220.

The one or more sensors 230 may acquire at least one among internal information of the robot 200, surrounding environment information, and user information using various sensors. The one or more sensors 230 may include an acceleration sensor, a magnetic sensor, a gyroscope sensor, an inertial sensor, a proximity sensor, an RGB sensor, an infrared (IR) sensor, an illumination sensor, a temperature sensor, a humidity sensor, a finger scan sensor, an ultrasonic sensor, an optical sensor, a microphone, a light detection and ranging (lidar) sensor, radar, or a combination thereof.

In an embodiment, the one or more sensors 230 may acquire surrounding environment information including at least one of a temperature or humidity at a current position, and provide the acquired surrounding environment information to the processor 270. The measured temperature or humidity may be used as auxiliary information indicating a specific location.

The driving unit 240 physically drives the robot 200. The driving unit 240 may include an actuator or a motor operated in accordance with a control signal from processor 270. The driving unit 240 may include a wheel, a brake, and a propeller, operated by the actuator or the motor.

The outputter 250 may generate a visual, auditory, or tactile related output. The outputter 250 may include a display unit outputting visual information, a speaker outputting auditory information, and a haptic module outputting tactile information.

The memory 280 may store data supporting various functions of the robot 200. The memory 280 may store information or data received by the communicator 210, and input information, input data, learning data, a learning model, and a learning history, obtained by the inputter 220.

In an embodiment, the memory 280 may store communication environment information acquired by the communicator 210, or surrounding environment information acquired by the one or more sensors 230. Moreover, the memory 280 may store an environmental profile and a learning profile, to be described below. In this disclosure, the communication environment information and the surrounding environment information may be collectively referred to as environment information.

The processor 270 may determine at least one executable operation of the robot 200, based on information determined or generated using a data analysis algorithm or a machine learning algorithm. In addition, the processor 270 may control components of the robot 200 to perform the determined operation.

The processor 270 may request, retrieve, receive, or use information or data of the learning processor 260 or the memory 280. The processor 270 may control components of the robot 200 to execute a predicted operation or an operation determined as preferable, of at least one executable operation. When connection with an external device such as the control server 120 or the terminal 130 is necessary to perform the determined operation, the processor 270 may generate a control signal to control the corresponding external device, and may transmit the generated control signal to the corresponding external device.

The processor 270 may control at least some of components of the robot 200, to drive an application stored in the memory 280. In order to drive the application, the processor 270 may operate two or more components included in the robot 200 in combination with each other.

In an embodiment, the processor 270 may determine a current position of the robot 200 based on at least one of communication environment information provided by the communicator 210 or the inputter 220, or surrounding environment information provided by the one or more sensors 230. To this end, learning of the environment information is required to be performed in advance.

Localization of the robot 200 according to an embodiment of the present disclosure may be divided into a learning operation of environment information and a localization operation of the robot 200. Hereinafter, the former operation will be described with reference to FIGS. 3 to 5, and the latter operation will be described with reference to FIG. 6.

Learning of Environment Information

Figure 3:
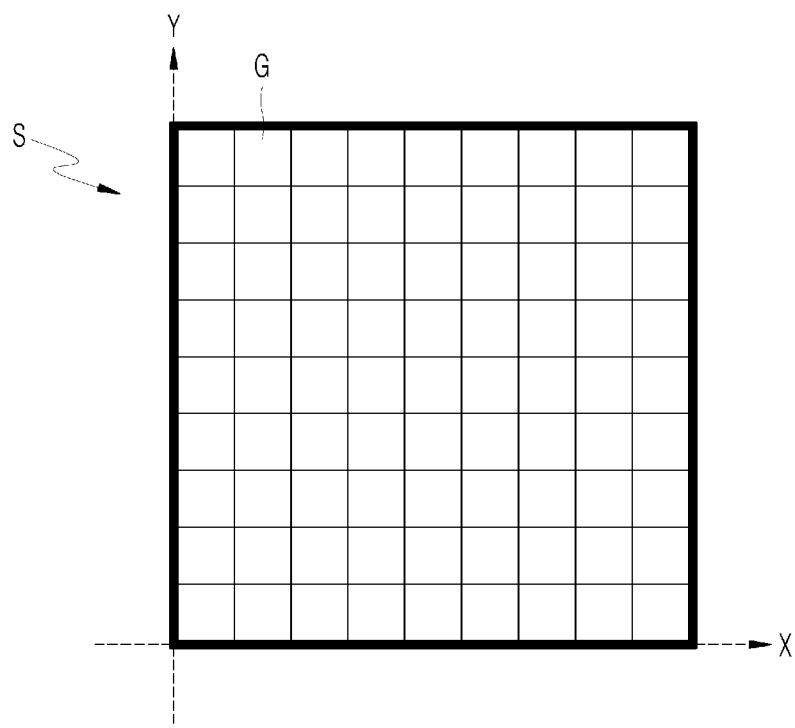
FIG. 3 is a view of an example of a space according to an embodiment of the present disclosure.
Figure 4:
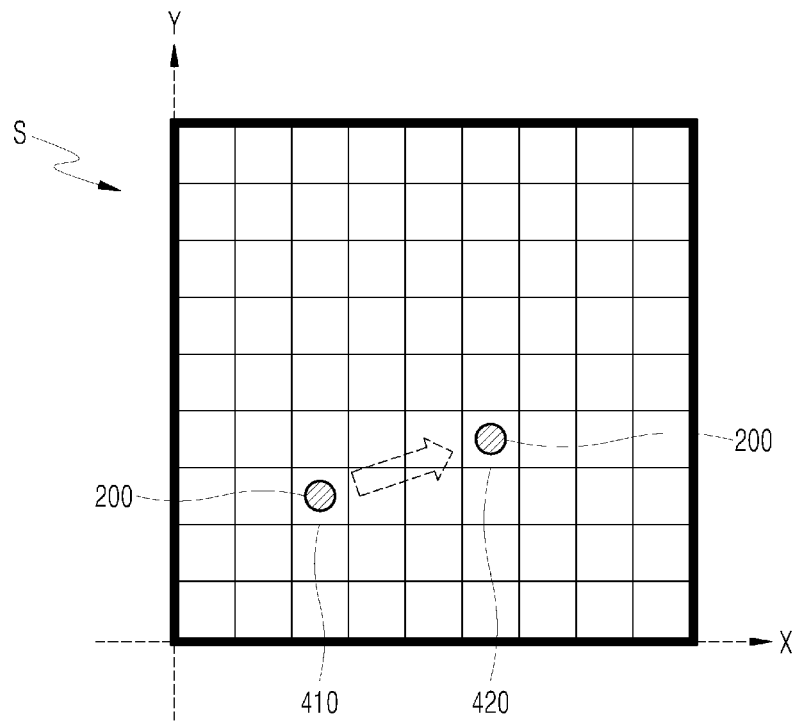
FIG. 4 is a view illustrating generating or updating of a learning profile according to an embodiment of the present disclosure.
Figure 4:
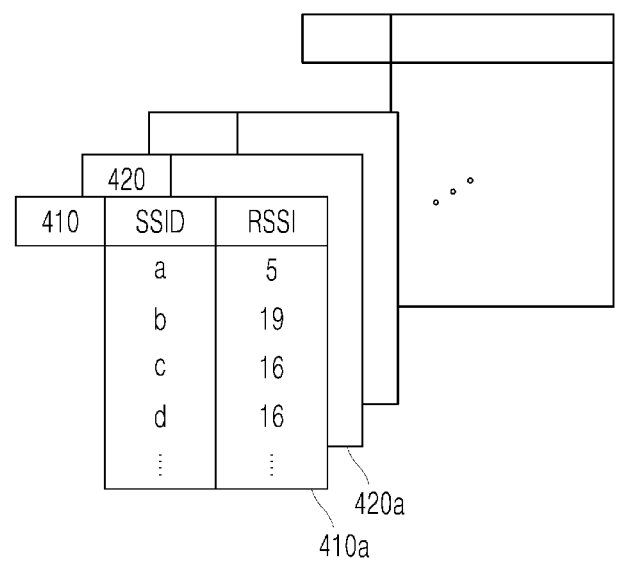

FIG. 3 is a view of an example of a space according to an embodiment of the present disclosure. FIG. 4 is a view illustrating generating or updating of a learning profile according to an embodiment of the present disclosure. FIG. 5 is a view illustrating a probability map of a learning profile according to an embodiment of the present disclosure.

Referring to FIG. 3, a space S, in which a robot 200 performs a task, may be defined. In an embodiment, the space S may be divided into a plurality of grid regions G. Each of the plurality of regions G may have the same shape and the same area. The shape or the area of each region G may be variously determined according to, for example, an area or attributes of the space S, a size or an area of the robot 200, and the design purpose. As an example, FIG. 3 illustrates the space S including 81 grid regions. In another embodiment, a plurality of regions G may include at least one region having a different shape and/or different area, depending on constraints of a physical space or design purposes.

When the space S is mapped to a coordinate system, location information of the robot 200 may be mapped to a region corresponding to the space S as two-dimensional coordinates (x, y). Moreover, azimuth information θ representing directionality of the robot 200 together with the two-dimensional coordinates (x, y) may be further mapped to the space S. In FIG. 3, the plurality of regions G constituting the space S may be associated with a two-dimensional coordinate plane.

Learning of environment information may be performed by a robot 200 in a normal driving state. The normal driving state refers to a state in which the robot 200 is driven while normally recognizing its current position using a conventional method. In contrast, an abnormal driving state refers to a state in which the robot 200 is unable to correctly recognize its current position due to an unexpected movement, or is unable to correctly recognize its current position using a conventional method.

The processor 270 determines a current position of the robot 200 in a normal driving state, and maps the determined current position to a corresponding region of a plurality of regions G. For example, as illustrated in FIG. 4, the processor 270 may map coordinates of a current position of a robot 200 to a corresponding region 410. After a certain time, when a robot 200 has moved, coordinates of a current position of the robot 200 may be mapped to a corresponding region 420.

A processor 270 may receive communication environment information for a current position from the communicator 210. The communication environment information may include identifiers of access points scanned at a current position and received signal strengths from the access points. In another embodiment, the communication environment information may further include information about a beacon signal received by a current position or information about a VLC signal. Moreover, the processor 270 may further receive, from the one or more sensors 230, surrounding environment information including a temperature or humidity measured at a current position.

The processor 270 may generate or update a learning profile for a corresponding region based on the acquired communication environment information and/or the acquired surrounding environment information. For example, as illustrated in FIG. 4, the processor 270 may generate a learning profile 410a for the region 410, based on communication environment information including SSIDs and RSSIs of the scanned access points. After a certain time, in a similar manner, the processor 270 may generate a learning profile 420a for the region 420. When there is no learning profile for a corresponding region in a memory 280, a learning profile may be newly generated. When there is a learning profile for a corresponding region in the memory 280, the learning profile may be updated. In this manner, learning profiles may be generated over the entirety of a plurality of regions. A learning profile may correspond to any one region of the plurality of regions in a one to one manner. As illustrated in FIG. 4, 81 learning profiles may be generated for a space S including 81 regions.

The learning profile refers to summary data of environment information trained for each of the plurality of regions. The environment information may include communication environment information acquired by the communicator 210 and/or surrounding environment information surrounding environment information acquired by the one or more sensors 230.

In an embodiment, environment information may be acquired repeatedly for each region. When environment information is acquired repeatedly, the processor 270 may generate a probability map for each learning profile.

In an embodiment, when communication environment information including identifiers of access points and received signal strengths is acquired repeatedly, the processor 270 may generate a probability map of a received signal strength for each of the identifiers of the access points.

As illustrated in FIG. 5A, communication environment information including MAC addresses and RSSIs of access points may be acquired four times for a corresponding region 410. In this case, as illustrated in FIG. 5B, a probability map of RSSIs corresponding to each access point may be generated. RSSI of an access point having a MAC address of '60:a4:4c:a0:5d:bc' was measured as '5' three times, and as '4' one time. Thus, the probability that RSSI is '5' is ¾=0.75, and the probability that RSSI is '4' is ¼=0.25. In this manner, the processor 270 may generate a probability map of a received signal strength for each identifier of access points for each learning profile.

In an embodiment, a probability map may be generated in a similar manner for a beacon signal and a VLC signal. As an example, a probability map of a received signal strength of a beacon signal may be generated for each identifier of the beacon signal. As another example, a probability map of a flickering frequency or a dimming rate may be generated for each identifier of the VLC.

In an embodiment, a probability map may be generated in a similar manner for surrounding environment information. For example, a probability map of a temperature or humidity may be generated by date or by time zone.

The probability maps described above may be appropriately combined in each learning profile. A learning profile including more probability maps may function as a more detailed fingerprint for a specific region.

When environment information is acquired repeatedly for a specific region, a learning profile for a corresponding region may be repeatedly updated. In an aspect, updating of a learning profile may include properly reflecting environment information, repeatedly acquired, in an existing learning profile. In this case, a higher weight may be given to recently acquired environmental information, as compared with previously acquired environment information. In another aspect, updating of a learning profile may include replacing of an existing learning profile with newly acquired environment information.

In an embodiment, updating of a learning profile may include modifying a probability map of the learning profile. For example, when RSSI of the access point having a MAC address of '60:a4:4c:a0:5d:bc' in FIG. 5 is next measured as '4', it may be modified such that the probability that RSSI is '5' is ⅗=0.6, and the probability that RSSI is '4' is ⅖=0.4.

The processor 270 may store the plurality of learning profiles, generated or updated using the method described above, in the memory 280. Moreover, the processor 270 may transmit the plurality of learning profiles, generated or updated, to an external device such as a control server 120 or a terminal 130 through the communicator 210.

Localization of Robot

FIG. 6 is a view illustrating localization based on an environmental profile according to an embodiment of the present disclosure.

Localization of a robot 200 according to an embodiment of the present disclosure may be performed by a robot 200 in an abnormal driving state. However, localization of the robot 200 according to an embodiment of the present disclosure may also be performed by a robot 200 in a normal driving state to correct its position.

A processor 270 receives communication environment information for a current position from a communicator 210. The communication environment information may include identifiers of access points and received signal strengths from the access points. In another embodiment, the communication environment information may further include information about a beacon signal received by a current position or information about a VLC signal. Moreover, the processor 270 may further receive, from the one or more sensors 230, surrounding environment information including a temperature or humidity measured at a current position.

The processor 270 may generate an environmental profile for a current position based on the acquired communication environment information and/or the acquired surrounding environment information. In an embodiment, the processor 270 may generate an environmental profile for a current position including SSIDs and RSSIs of access points. The environmental profile refers to summary data of environment information acquired at a current position.

The processor 270 sequentially compares the generated environmental profile with a plurality of learning profiles stored in the memory 280 so as to determine a learning profile corresponding to an environmental profile. The processor 270 compares an environmental profile with each of a plurality of learning profiles so as to determine a degree of similarity between the environmental profile and each of the plurality of learning profiles. The processor 270 may determine a learning profile corresponding to an environmental profile based on the determined degree of similarity.

In an embodiment, a plurality of learning profiles may not be stored in the memory 280. The processor 270 may receive a plurality of learning profiles from a control server 120 or a terminal 130.

In an embodiment, a degree of similarity between an environmental profile and a learning profile may be derived using a probability map of the learning profile. As described above, the learning profile may include a probability map of a received signal strength for each access point. The probability map may include probability values for each received signal strength.

The processor 270 may compare identifiers and received signal strengths of access points in an environmental profile with a probability map of a learning profile. The comparison operation may include determining whether access points match each other, and associating a received signal strength of the matching access point with a probability value of a probability map. For example, when an environmental profile, illustrated in FIG. 6, is compared with a learning profile of FIG. 5B, the MAC addresses of access points are the same. RSSIs of access points in an environmental profile, determined as being the same or matching, may be associated with a probability map of FIG. 5B as illustrated in FIG. 6. As an example, an RSSI level '4' of an access point having a MAC address of '60:a4:4c:a0:5d:bc' may be associated with '0.25' of the probability map of FIG. 5B. Moreover, an RSSI level '19' of an access point having a MAC address of '34:97:f6:6c:c3:a0' may be associated with '1.0' of the probability map of FIG. 5B. In the same manner, comparison of remaining access points with the probability map may be performed, and the sum of associated probability values may refer to a similarity score between an environmental profile and a learning profile.

If an environmental profile includes an access point that does not exist in a learning profile, the probability value for that access point may be '0'. Moreover, even when an access point of an environmental profile exists in a learning profile, if RSSI of a corresponding access point does not exist in a probability map of the learning profile, the probability value for the corresponding access point may also be '0'. For example, in FIG. 6, RSSI of an access point having a MAC address of '00:23:04:88:ef:a7' is measured as '15', but the probability map of FIG. 5B does not include '15' for a corresponding access point. Thus, the probability value for the corresponding access point may be '0'.

In this manner, the processor 270 may determine a similarity score between an environmental profile and each of a plurality of learning profiles, and the processor 270 may determine a learning profile having the highest similarity score as a learning profile corresponding to an environmental profile.

The processor 270 may determine a region associated with the determined learning profile as a current position of the robot 200. In an embodiment, the processor 270 may determine a central point of a region associated with the determined learning profile as the current position of the robot 200.

Figure 7:
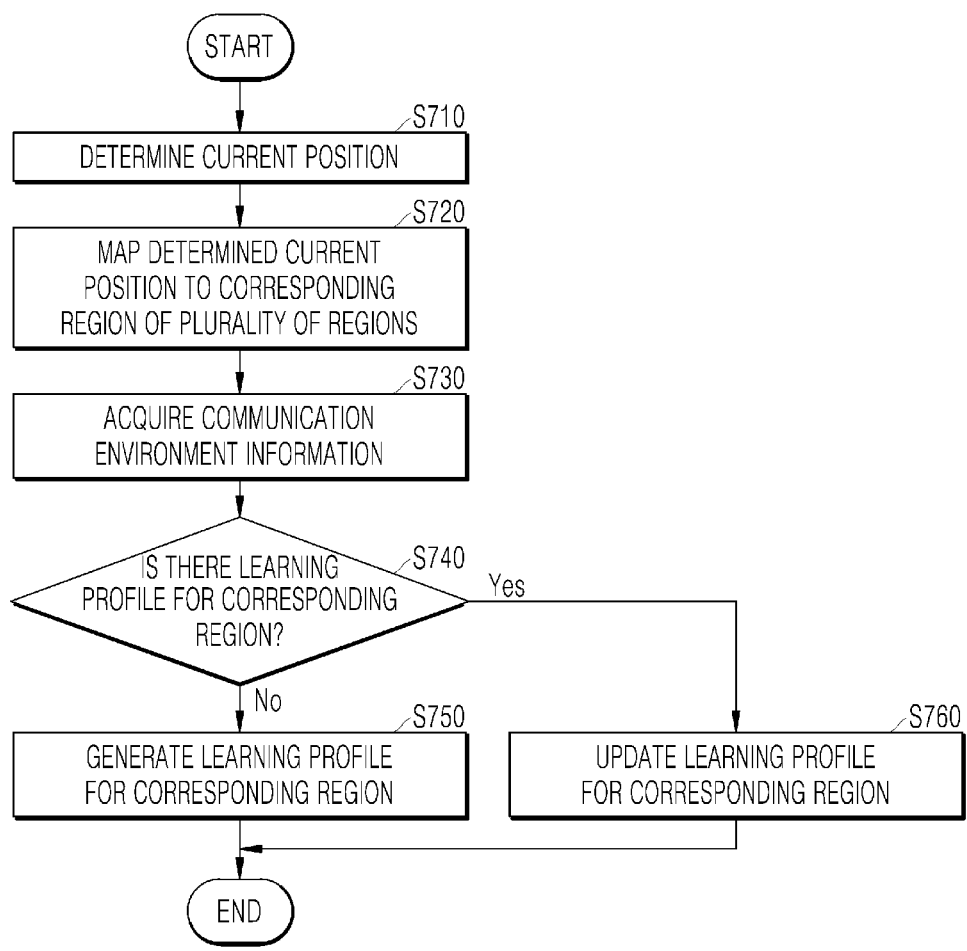
FIG. 7 is a flow chart illustrating a method for localizing a robot according to an embodiment of the present disclosure.

FIG. 7 is a flow chart illustrating a method for localizing a robot according to an embodiment of the present disclosure. The method, illustrated in FIG. 7, may be performed by the robot 200 of FIG. 2. FIG. 7 illustrates steps for constructing a learning profile by the robot 200 in a normal driving state.

In step S710, the robot 200 determines its current position. The determination of the current position may be performed by a conventional method.

In step S720, the robot 200 maps the determined current position to a corresponding region of a plurality of regions.

In step S730, the robot 200 acquires communication environment information for a current position through the communicator 210. The communication environment information may include identifiers of access points scanned at a current position and received signal strengths. In another embodiment, the communication environment information may further include information about a beacon signal received by a current position or information about a VLC signal. Meanwhile, the robot 200 may further acquire, through the one or more sensors 230, surrounding environment information including a temperature or humidity measured at a current position. Step S730 may be performed before step S710 and step S720, or may be performed substantially simultaneously with step S710 or step S720.

In step S740, the robot 200 may check that there is a learning profile for a corresponding region with reference to the memory 280.

In step S750, when there is no learning profile for a corresponding region, the robot 200 may generate a learning profile for the corresponding region based on the acquired communication environment information and/or the acquired surrounding environment information. In an embodiment, the robot 200 may generate a learning profile including identifiers and received signal strengths of access points. The learning profile may include a probability map of received signal strengths for each of the access points.

In step S760, when there is a learning profile for a corresponding region, the robot 200 may update the learning profile for the corresponding region based on the acquired communication environment information and/or the acquired surrounding environment information. In an embodiment, updating of a learning profile may include modifying a probability map of an existing learning profile according to newly acquired communication environment information and/or newly acquired surrounding environment information.

Figure 8:
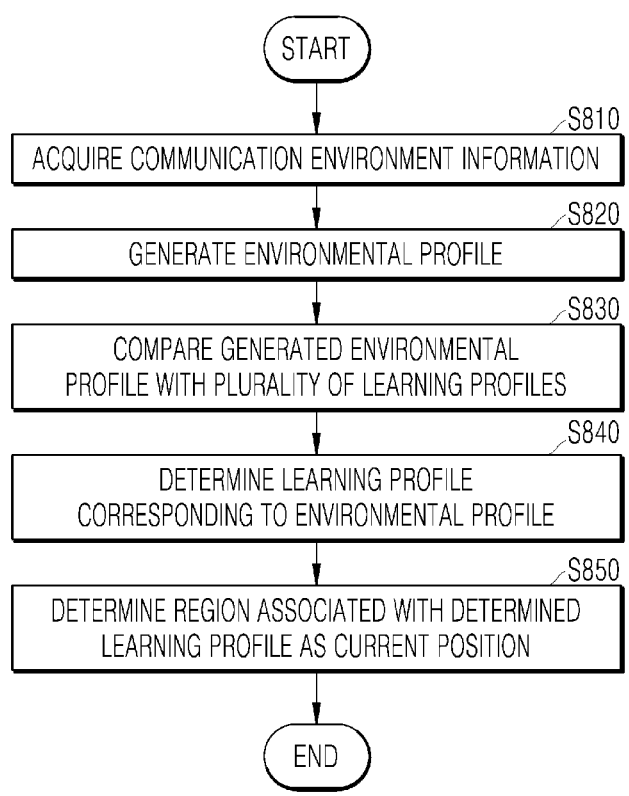
FIG. 8 is a flow chart illustrating a method for localizing a robot according to an embodiment of the present disclosure.

FIG. 8 is a flow chart illustrating a method for localizing a robot according to an embodiment of the present disclosure. The method illustrated in FIG. 8 may be performed by the robot 200 of FIG. 2. FIG. 8 illustrates an operation in which the robot 200 in an abnormal driving state recognizes its position. However, in some embodiments, the method of FIG. 8 may be used for the robot 200 in a normal driving state to correct its position.

In step S810, the robot 200 acquires communication environment information for a current position through the communicator 210. The communication environment information may include identifiers of access points scanned at a current position and received signal strengths. In another embodiment, the communication environment information may further include information about a beacon signal received by a current position or information about a VLC signal. Meanwhile, the robot 200 may further acquire, through the one or more sensors 230, surrounding environment information including a temperature or humidity measured at a current position.

In step S820, the robot 200 may generate an environmental profile for a current position based on the acquired communication environment information and/or the acquired surrounding environment information. In an embodiment, the processor 270 may generate an environmental profile for a current position including identifiers and received signal strengths of access points.

In step S830, the robot 200 compares the generated environmental profile with a plurality of learning profiles stored in the memory 280. The robot 200 may sequentially compare the generated environmental profile with each of a plurality of learning profiles so as to determine a degree of similarity between the environmental profile and each of the plurality of learning profiles. In an embodiment, the robot 200 may compare identifiers and received signal strengths of access points in an environmental profile with a probability map of a learning profile so as to calculate a similarity score between the environmental profile and the learning profile.

In step S840, the robot 200 determines a learning profile corresponding to the environmental profile based on a comparison result. The robot 200 may determine a learning profile corresponding to the environmental profile based on the determined degree of similarity. In an embodiment, the robot 200 may determine a learning profile having the highest degree of similarity score as a learning profile corresponding to the environmental profile.

In step S850, the robot 200 determines a region associated with the determined learning profile as its current position. In an embodiment, the processor 270 may determine a central point of a region associated with the determined learning profile as the current position of the robot 200.

Meanwhile, referring to FIG. 2, in an embodiment, the robot 200 may further include a learning processor 260 for performing an operation on artificial intelligence and/or machine learning.

Artificial intelligence refers to a field of studying artificial intelligence or a methodology for creating the same. Moreover, machine learning refers to a field of defining various problems dealing in an artificial intelligence field and studying methodologies for solving the same. In addition, machine learning may be defined as an algorithm for improving performance with respect to a task through repeated experience with respect to the task.

An artificial neural network (ANN) is a model used in machine learning, and may refer in general to a model with problem-solving abilities, composed of artificial neurons (nodes) forming a network by a connection of synapses. The ANN may be defined by a connection pattern between neurons on different layers, a learning process for updating a model parameter, and an activation function for generating an output value.

The ANN may include an input layer, an output layer, and may selectively include one or more hidden layers. Each layer includes one or more neurons, and the artificial neural network may include synapses that connect the neurons to one another. In an ANN, each neuron may output a function value of an activation function with respect to the input signals inputted through a synapse, weight, and bias.

A model parameter refers to a parameter determined through learning, and may include weight of synapse connection, bias of a neuron, and the like. Moreover, a hyperparameter refers to a parameter which is set before learning in a machine learning algorithm, and includes a learning rate, a number of repetitions, a mini batch size, an initialization function, and the like.

The objective of training an ANN is to determine a model parameter for significantly reducing a loss function. The loss function may be used as an indicator for determining an optimal model parameter in a learning process of an artificial neural network.

The machine learning may be classified into supervised learning, unsupervised learning, and reinforcement learning depending on the learning method.

Supervised learning may refer to a method for training an artificial neural network with training data that has been given a label. In addition, the label may refer to a target answer (or a result value) to be guessed by the artificial neural network when the training data is inputted to the artificial neural network. Unsupervised learning may refer to a method for training an artificial neural network using training data that has not been given a label. Reinforcement learning may refer to a learning method for training an agent defined within an environment to select an action or an action order for maximizing cumulative rewards in each state.

Machine learning of an artificial neural network implemented as a deep neural network (DNN) including a plurality of hidden layers may be referred to as deep learning, and the deep learning is one machine learning technique. Hereinafter, the meaning of machine learning includes deep learning.

The learning processor 260 may allow a model, composed of an artificial neural network to be trained using learning data. Here, the trained artificial neural network may be referred to as a trained model. The trained model may be used to infer a result value with respect to new input data rather than learning data, and the inferred value may be used as a basis for a determination to perform an operation.

The learning processor 260 may train an artificial neural network using one or more of various parameters used to determine a current location of a robot as learning data.

In an embodiment, the learning processor 260 may train an artificial neural network using information about a space S, a current position of the robot 200, environment information acquired by the robot 200, and a learning profile or an environmental profile, generated by a robot 200, as learning data.

In an embodiment, the learning processor 260 may determine or correct a current position of the robot 200 by analyzing communication environment information or surrounding environment information acquired by the robot 200, or an environmental profile generated by the robot 200, using a learning model based on the artificial neural network.

Figure 9:
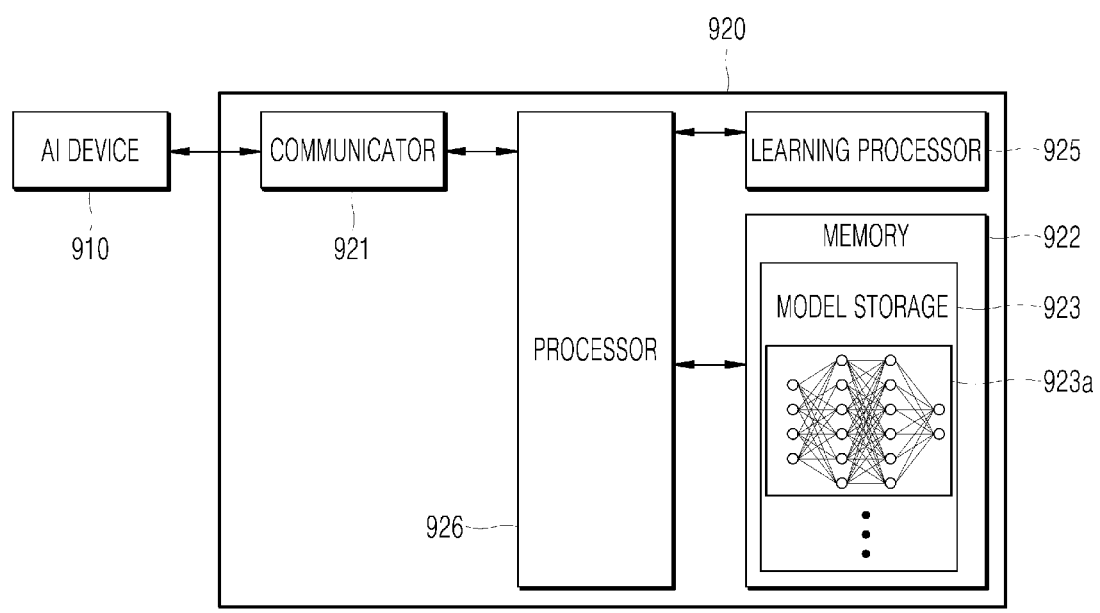
FIG. 9 is a view illustrating a robot system according to another embodiment of the present disclosure.

The learning processor 260 may perform artificial intelligence and/or machine learning processing together with a learning processor 925 of an AI server 920 of FIG. 9. The learning processor 260 may include a memory integrated or implemented in the robot 200. Alternatively, the learning processor 260 may be implemented using the memory 280, an external memory directly coupled to the robot 200, or a memory maintained in an external device.

FIG. 9 is a view illustrating a robot system according to another embodiment of the present disclosure. In an embodiment, a robot system may be implemented as an AI system capable of performing artificial intelligence and/or machine learning. Referring to FIG. 9, a robot system according to another embodiment of the present disclosure may include an AI device 910 and an AI server 920.

In an embodiment, the AI device 910 and the AI server 920 may be implemented as any combinations derived by the robot 110 of FIG. 1 or the robot 200 of FIG. 2, the control server 120, and the terminal 130.

The AI server 920 may refer to a device training an artificial neural network using a machine learning algorithm or using a trained artificial neural network. The AI server 920 may be composed of a plurality of servers to perform distributed processing. The AI server 920 is included as a configuration of a portion of the AI device 910, and may perform at least a portion of the artificial intelligence and/or machine learning processing.

The AI server 920 may include a communicator 921, a memory 922, a learning processor 925, and a processor 926.

The communicator 921 may transmit and receive data with an external device such as the AI device 910, or the like.

The memory 922 may include a model storage 923. The model storage 923 may store a model (or an artificial neural network 923a) learning or learned through the learning processor 925.

The learning processor 925 may train the artificial neural network 923a using learning data. The learning model may be used while mounted in the AI server 920 of the artificial neural network, or may be used while mounted in an external device such as the AI device 910, or the like.

The learning model may be implemented as hardware, software, or a combination of hardware and software. When a portion or the entirety of a learning model is implemented as software, one or more instructions, which constitute the learning model, may be stored in the memory 922.

The processor 926 may infer a result value with respect to new input data using the learning model, and generate a response or control command based on the inferred result value.

The embodiments of the present disclosure described above may be implemented through computer programs executable through various components on a computer, and such computer programs may be recorded in computer-readable media. Examples of the computer readable medium may include magnetic media such as a hard disk drives (HDD), floppy disks and a magnetic tapes, optical media such as CD-ROMs and DVDs, magneto-optical media such as floptical disks, or hardware devices such as ROMs, RAMs, and flash memories specifically configured to store and execute program commands.

Meanwhile, the computer programs may be those specially designed and constructed for the purposes of the present disclosure or they may be of the kind well known and available to those skilled in the computer software arts. Examples of program code include both a machine code, such as produced by a compiler, and a higher-level code that may be executed by the computer using an interpreter.

In the present application (especially, in the appended claims), the use of the terms "the", "the above-mentioned", and/or other terms similar thereto may correspond to singular meaning, plural meaning, or both of the singular meaning and the plural meaning as necessary. Also, it should be understood that any numerical range recited herein is intended to include all sub-ranges subsumed therein (unless expressly indicated otherwise) and accordingly, the disclosed numeral ranges include every individual value between the minimum and maximum values of the numeral ranges.

The above-mentioned steps constructing the method disclosed in the present disclosure may be performed in a proper order unless explicitly stated otherwise. However, the scope or spirit of the present disclosure is not limited thereto. All examples described herein or the terms indicative thereof ("for example", "such as") used herein are merely to describe the present disclosure in greater detail. Therefore, it should be understood that the scope of the present disclosure is not limited to the example embodiments described above or by the use of such terms unless limited by the appended claims. In addition, technical ideas of the present disclosure can also be readily implemented by those skilled in the art according to various conditions and factors within the scope of the appended claims to which various modifications, combinations, and changes are added, or equivalents thereof.

Therefore, technical ideas of the present disclosure are not limited to the above-mentioned embodiments, and it is intended that not only the appended claims, but also all changes equivalent to claims, should be considered to fall within the scope of the present disclosure.

What is claimed is:

1. A method for localizing a robot, the method comprising:
   acquiring communication environment information comprising identifiers of access points and received signal strengths from the access points;
   generating an environmental profile for a current position of the robot, based on the acquired communication environment information;
   comparing the generated environmental profile with a plurality of learning profiles associated with a plurality of regions;
   determining a learning profile corresponding to the environmental profile, based on the comparison; and
   determining a region associated with the determined learning profile as the current position of the robot,
   wherein each of the plurality of learning profiles comprises a probability map of a received signal strength for each of the access points.

2. The method of claim 1, wherein the communication environment information further comprises information about at least one of a beacon signal or a visible light communication signal.

3. The method of claim 1, further comprising acquiring surrounding environment information of the current position,
   wherein the generating the environmental profile is further based on the acquired surrounding environment information.

4. The method of claim 1, wherein the comparing comprises:
   for each of the plurality of learning profiles:
   determining whether access points in the environmental profile match the access points in the learning profile;
   associating the received signal strengths of the matching access points with the probability map; and
   determining a degree of similarity between the environmental profile and the learning profile, based on the association.

5. The method of claim 4, wherein the determining the learning profile corresponding to the environmental profile comprises determining a learning profile having a highest degree of similarity as the learning profile corresponding to the environmental profile.

6. The method of claim 1, wherein a central point of the region associated with the determined learning profile is determined as the current position of the robot.

7. The method of claim 1, further comprising correcting the current position of the robot by analyzing the acquired communication environment information or the generated environmental profile using a learning model based on an artificial neural network.

8. A method for localizing a robot, the method comprising:
 determining a current position of the robot;
 mapping the determined current position to a corresponding region of a plurality of regions;
 acquiring communication environment information comprising identifiers of access points and received signal strengths from the access points; and
 generating or updating a learning profile for the corresponding region, based on the acquired communication environment information,
 wherein the learning profile comprises a probability map of a received signal strength for each of the access points.

9. The method of claim 8, wherein the communication environment information further comprises information about at least one of a beacon signal or a visible light communication signal.

10. The method of claim 8, wherein the generating or updating the learning profile comprises generating or modifying the probability map.

11. The method of claim 8, further comprising training an artificial neural network by using, as learning data, the acquired communication environment information, the determined current position, and the learning profile.

12. A robot comprising:
 a communicator configured to acquire communication environment information comprising identifiers of access points and received signal strengths from the access points; and
 at least one processor configured to:
  generate an environmental profile for a current position of the robot, based on the acquired communication environment information;
  compare the generated environmental profile with a plurality of learning profiles associated with a plurality of regions;
  determine a learning profile corresponding to the environmental profile, based on the comparison; and
  determine a region associated with the determined learning profile as the current position of the robot,
 wherein each of the plurality of learning profiles comprises a probability map of a received signal strength for each of the access points.

13. The robot of claim 12, wherein the communication environment information further comprises information about at least one of a beacon signal or a visible light communication signal.

14. The robot of claim 12, further comprising one or more sensors configured to acquire surrounding environment information of the current position,
 wherein the at least one processor is further configured to generate the environmental profile further based on the acquired surrounding environment information.

15. The robot of claim 12, wherein the at least one processor is further configured to:
 for each of the plurality of learning profiles:
 determine whether access points in the environmental profile match the access points in the learning profile;
 associate the received signal strengths of the matching access points with the probability map; and
 determine a degree of similarity between the environmental profile and the learning profile, based on the association.

16. The robot of claim 15, wherein the at least one processor is further configured to determine a learning profile having a highest degree of similarity as the learning profile corresponding to the environmental profile.

17. The robot of claim 12, wherein the at least one processor is further configured to determine, as the current position, a central point of the region associated with the determined learning profile.

* * * * *